US008977250B2

(12) United States Patent
Malamud et al.

(10) Patent No.: US 8,977,250 B2
(45) Date of Patent: Mar. 10, 2015

(54) CONTEXT-AWARE FILTER FOR PARTICIPANTS IN PERSISTENT COMMUNICATION

(75) Inventors: Mark A. Malamud, Seattle, WA (US); Paul G. Allen, Seattle, WA (US); Royce A. Levien, Lexington, MA (US); John D. Rinaldo, Jr., Bellevue, WA (US); Edward K. Y. Jung, Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1987 days.

(21) Appl. No.: 10/927,842

(22) Filed: Aug. 27, 2004

(65) Prior Publication Data

US 2006/0046707 A1    Mar. 2, 2006

(51) Int. Cl.
*H04M 11/00* (2006.01)

(52) U.S. Cl.
CPC ................................ *H04M 11/005* (2013.01)
USPC ........... 455/418; 455/415; 455/516; 455/311; 704/208; 345/632; 345/625; 379/88.01

(58) Field of Classification Search
USPC .......... 455/418, 415, 416, 311, 516; 704/208; 345/632, 625; 379/88.01
See application file for complete search history.

(56) References Cited

U.S. PATENT DOCUMENTS

| 4,952,931 | A | 8/1990 | Serageldin et al. |
| 5,386,210 | A | 1/1995 | Lee |
| 5,436,653 | A | 7/1995 | Ellis et al. |
| 5,548,188 | A | 8/1996 | Lee |
| 5,675,708 | A | 10/1997 | Fitzpatrick et al. |
| 6,212,233 | B1 | 4/2001 | Alexandre et al. |
| 6,262,734 | B1 | 7/2001 | Ishikawa |
| 6,269,483 | B1 * | 7/2001 | Broussard ...................... 725/143 |
| 6,317,776 | B1 | 11/2001 | Broussard et al. |
| 6,396,399 | B1 | 5/2002 | Dunlap |
| 6,438,223 | B1 | 8/2002 | Eskafi et al. |
| 6,617,980 | B2 | 9/2003 | Endo et al. |
| 6,622,115 | B1 | 9/2003 | Brown et al. |
| 6,690,883 | B2 | 2/2004 | Pelletier |
| 6,720,949 | B1 | 4/2004 | Pryor et al. |
| 6,775,835 | B1 | 8/2004 | Ahmad et al. |
| 6,819,919 | B1 * | 11/2004 | Tanaka ........................ 455/414.1 |
| 7,043,530 | B2 | 5/2006 | Isaacs et al. |
| 7,120,865 | B1 | 10/2006 | Horvitz et al. |
| 2001/0039873 | A1 * | 11/2001 | Yi et al. .......................... 84/610 |
| 2002/0025026 | A1 * | 2/2002 | Gerszberg et al. ........... 379/67.1 |
| 2002/0028674 | A1 | 3/2002 | Slettengren et al. |
| 2002/0039408 | A1 * | 4/2002 | Hall et al. .................. 379/90.01 |
| 2002/0155844 | A1 | 10/2002 | Rankin et al. |
| 2002/0176585 | A1 * | 11/2002 | Egelmeers et al. ......... 381/71.11 |

(Continued)

FOREIGN PATENT DOCUMENTS

WO    WO 03/058485 A1    7/2003

OTHER PUBLICATIONS

Rugaard, Peer; Sapaty, Peter; "Mobile Control of Mobile Communications"; pp. 1-2; located at: http://www-zorn.ira.uka.de/wave/abstract2.html; printed on Mar. 4, 2005.

(Continued)

*Primary Examiner* — Ariel Balaoing

(57) ABSTRACT

A processing device local context is determined, and a communication of the processing device is filtered at least in part according to the local context.

29 Claims, 5 Drawing Sheets

(56) References Cited

U.S. PATENT DOCUMENTS

| | | |
|---|---|---|
| 2002/0184505 A1 | 12/2002 | Mihcak et al. |
| 2003/0048880 A1* | 3/2003 | Horvath et al. ............ 379/88.01 |
| 2003/0117987 A1 | 6/2003 | Brebner |
| 2003/0158900 A1* | 8/2003 | Santos ......................... 709/205 |
| 2003/0202780 A1 | 10/2003 | Dumm et al. |
| 2004/0012613 A1* | 1/2004 | Rast ............................. 345/632 |
| 2004/0044777 A1 | 3/2004 | Alkhatib et al. |
| 2004/0109023 A1 | 6/2004 | Tsuchiya |
| 2004/0127241 A1 | 7/2004 | Shostak |
| 2004/0143636 A1 | 7/2004 | Horvitz et al. |
| 2004/0148346 A1 | 7/2004 | Weaver et al. |
| 2004/0162904 A1* | 8/2004 | Eida et al. .................... 709/228 |
| 2004/0205775 A1 | 10/2004 | Heikes et al. |
| 2004/0215731 A1 | 10/2004 | Tzann-en Szeto |
| 2004/0215732 A1 | 10/2004 | McKee et al. |
| 2004/0236836 A1 | 11/2004 | Appelman et al. |
| 2004/0243682 A1 | 12/2004 | Markki et al. |
| 2004/0257273 A1* | 12/2004 | Benco et al. ............... 342/357.1 |
| 2005/0018925 A1* | 1/2005 | Bhagavatula et al. ........ 382/278 |
| 2005/0053356 A1 | 3/2005 | Mate et al. |
| 2005/0097131 A1* | 5/2005 | Benco et al. ............... 707/104.1 |
| 2005/0125500 A1 | 6/2005 | Wu |
| 2006/0004911 A1 | 1/2006 | Becker et al. |
| 2006/0187305 A1 | 8/2006 | Trivedi et al. |
| 2007/0203911 A1 | 8/2007 | Chiu |
| 2007/0288978 A1 | 12/2007 | Pizzurro et al. |
| 2008/0037840 A1 | 2/2008 | Steinberg et al. |
| 2008/0059530 A1 | 3/2008 | Cohen et al. |

OTHER PUBLICATIONS

PCT International Search Report; International App. No. PCT/US05/29768; Apr. 18, 2006.

PCT International Search Report; International App. No. PCT/US05/26428; Feb. 2, 2006.

PCT International Search Report; International App. No. PCT/US05/26429; Feb. 1, 2007.

* cited by examiner

CONTEXT-AWARE FILTER FOR PARTICIPANTS IN PERSISTENT COMMUNICATION

TECHNICAL FIELD

The present disclosure relates to inter-device communication.

BACKGROUND

Modern communication devices are growing increasingly complex. Devices such as cell phones and laptop computers now often are equipped with cameras, microphones, and other sensors. Depending on the context of a communication (e.g. where the person using the device is located and to whom they are communicating, the date and time of day, among possible factors), it may not always be advantageous to communicate information collected by the device in its entirety, and/or unaltered.

SUMMARY

The following summary is intended to highlight and introduce some aspects of the disclosed embodiments, but not to limit the scope of the invention. Thereafter, a detailed description of illustrated embodiments is presented, which will permit one skilled in the relevant art to make and use aspects of the invention. One skilled in the relevant art can obtain a full appreciation of aspects of the invention from the subsequent detailed description, read together with the figures, and from the claims (which follow the detailed description).

A local communication context for a device is determined, communication of the device is filtered at least in part according to the local context. Some aspects that may help determine the local context include identifying at least one functional object of the local context, such as a machine, control, tool, fixture, appliance, or utility feature; identifying at least one of a designated area or zone, proximity to other devices or objects or people, or detecting a presence of a signal or class of signals (such as a short range or long range radio signal); identifying a sound or class of sound to which the device is exposed, such as spoken words, the source of spoken words, music, a type of music, conversation, traffic sounds, vehicular sounds, or sounds associated with a service area or service establishment; sounds of human activity, animal sounds, weather sounds, or other nature sounds. 12. Filtering the communication of the processing device may involve altering a level, pitch, tone, or frequency content of sound information of the communication of the processing device, and/or removing, restricting, or suppressing sound information of the communication. Filtering may include substituting pre-selected sound information for sound information of the communication.

The local context may be determined at least in part from images obtained from the local environment, such as one or more digital photographs. Filtering communication of the processing device may include altering the intensity, color content, shading, lighting, hue, saturation, reflectivity, or opacity of visual information of the communication of the processing device, and/or removing, reducing, restricting, or suppressing visual information of the communication of the processing device. Visual information of the communication may be restricted to one or more sub-regions of a camera field. Filtering may include substituting pre-selected visual information for visual information of the communication.

A remote communication context for the device may be determined, and communication of the device filtered according to the remote context. Determining a remote communication context for the processing device may include identifying an attribute of a caller, such as an identity of the caller, determined via such manners as caller's phone number or other communication address, the caller's membership in a group, organization, or other entity, or the caller's level of authority.

Further aspects are recited in relation to the Figures and the claims.

BRIEF DESCRIPTION OF THE DRAWINGS

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well known structures and functions have not been shown or described in detail to avoid unnecessarily obscuring the description of the embodiments of the invention. References to "one embodiments" or "an embodiment" do not necessarily refer to the same embodiment, although they may.

Figure 1:
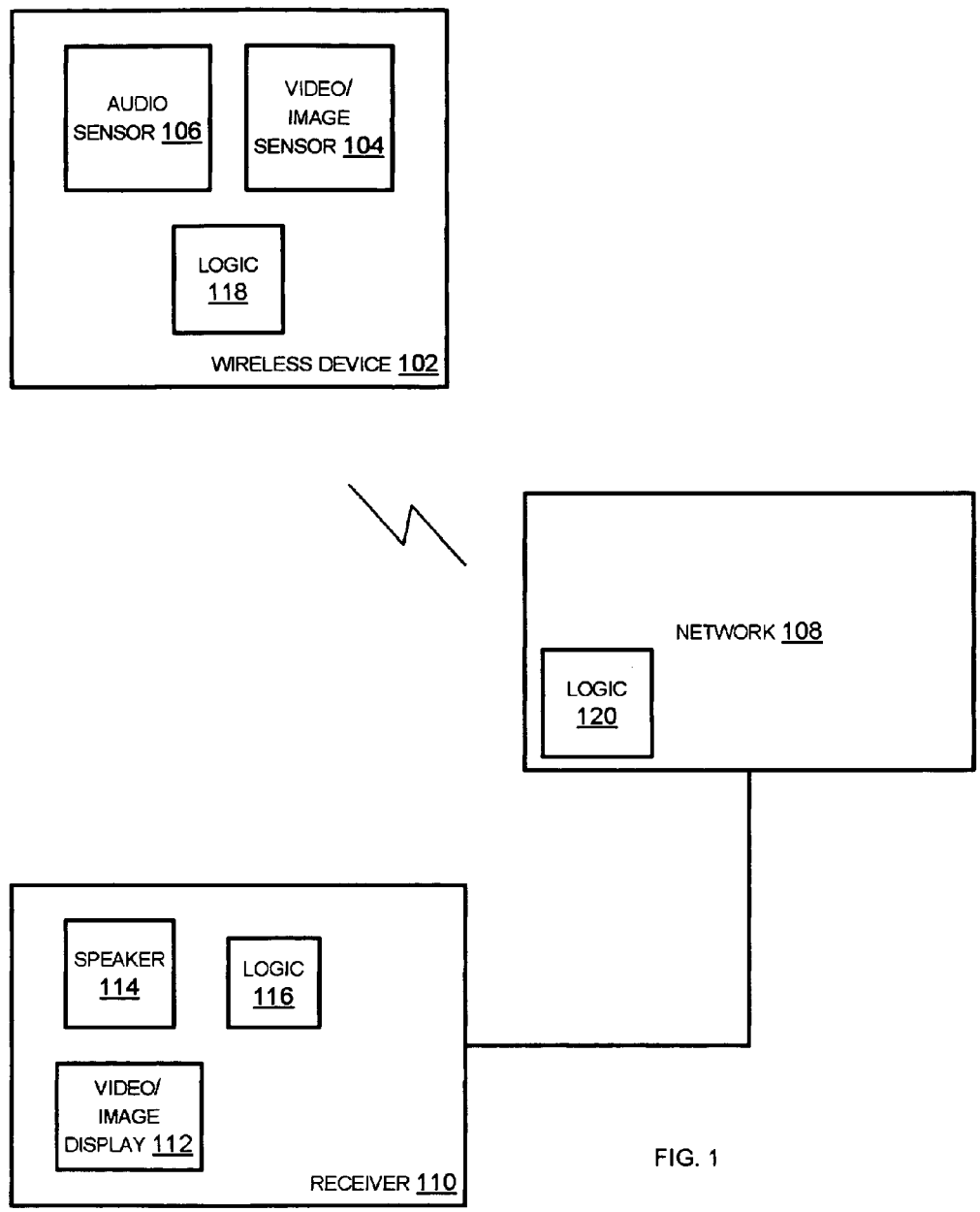
FIG. 1 is a block diagram of an embodiment of an inter-device communication arrangement.

FIG. 1 is a block diagram of an embodiment of an inter-device communication arrangement. A wireless device 102 comprises a video/image sensor 104, an audio sensor 106, and logic 118. The video/image sensor 104 senses visual information of the environment of the wireless device, enabling communication from the wireless device that includes visual information (e.g. a camera and/or video enabled phone). The audio sensor 106 (e.g. a microphone) senses sound information of the device's local environment, enabling communication of sound information from the wireless device. The logic 118 defines processing operations of the wireless device 102. The wireless device 102 is in wireless communication with a network 108, by way of which it may communicate with remote devices such as receiver 110. The receiver 110 may be any device capable of communicating with the wireless device 102. Examples include another wireless device, a personal computer, a personal digital assistant, a television, and so on. The receiver 110 comprises a video/image display 112 for displaying visual information received from the wireless device 102, a speaker 114 to render sound information received from the wireless device 102, and logic 116 to define processing operations of the receiver 110.

The receiver 110 is shown coupled to the network 108 via wired mechanisms, such as conventional telephone lines or wired broadband technologies such as Digital Subscriber Line and cable, in order to illustrate a variety of communication scenarios. However the receiver 110 could of course be coupled to the network 108 via wireless technologies.

The camera (image sensor 106) and/or microphone 106 of the wireless device 102 may be employed to collect visual information and sounds of a local context of the wireless device 102. Visual and/or sound information communicated from the wireless device 102 to the remote device 110 may be altered, restricted, removed, or replaced, according to the visual information and/or sounds of the local context. Furthermore, visual and/or sound information communicated from the wireless device 102 to the remote device 110 may be altered, restricted, removed, or replaced, according to aspects of a remote context of the remote device 110. For example, an identity of a caller associated with the remote device 110 may be ascertained, for example by processing a voice of the caller. According to the identity of the caller, at least one of the visual information and sound of output signals of the wireless device 102 may be restricted. These and other aspects of the communication arrangement are additionally described in conjunction with FIGS. 2-5.

Figure 2:
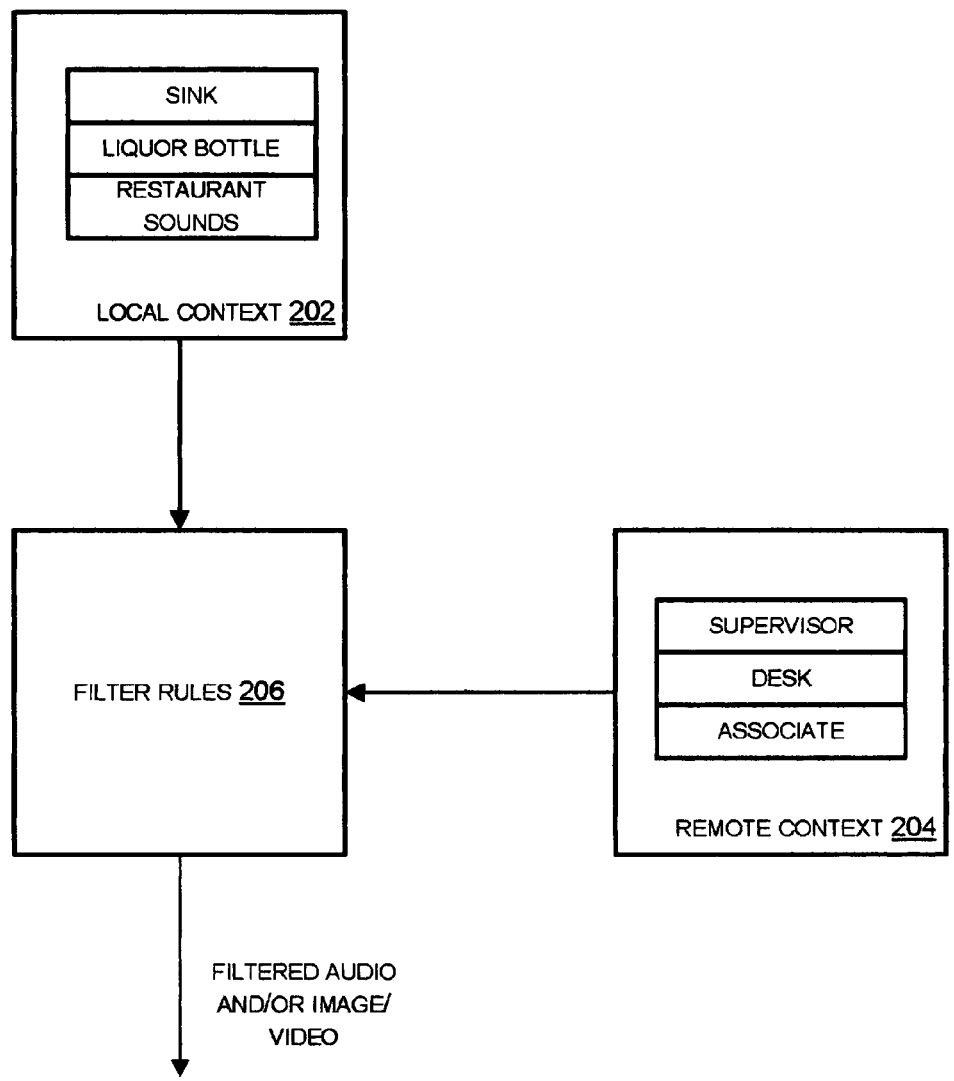
FIG. 2 is a block diagram of an embodiment of a process to affect a filter applied to device communication.

FIG. 2 is a block diagram of an embodiment of a process to affect a filter applied to device communication. A local context 202 for a device comprises various objects, including a sink, a liquor bottle, and restaurant sounds. Based upon this information, it may be ascertained that the person carrying the device is in a restaurant, night dub, or drinking establishment. The device may then receive a call. A remote context for the communication includes a supervisor of the called party, a desk, and an associate of the called party. Based upon this information, it may be ascertained that the call originates from on office where the called party works. The called party, not wanting to be identified in a restaurant, bar, or other entertainment facility during work hours, may not want the caller to become aware of the various sounds and objects of his local environment. The remote context and local context may be applied to filter rules 206, which the person has configured to remove certain information from his device's communications under these circumstances. The filter rules 206 may remove, suppress, restrict, or otherwise filter background undesirable sounds and/or visual information of the local establishment, so that the called party's compromising location is not revealed to the caller.

Thus, a local communication context for a device is determined according to factors of the local environment the device is operating in. Context factors may include functional objects of the local context, such as a machine, control (lever, switch, button, etc.), tool, fixture, appliance, or utility feature (e.g. a mop, broom, pipes, etc.). Context factors may also include identifying a designated area or zone that the device is operating in, determining proximity of the device to other devices or objects or people, or detecting a presence of a signal or class of signals. A signal or class of signals may include a wireless signal conforming to a known application, such as a short range or long range radio signal (e.g. Bluetooth™ signals).

The local context may be determined at least in part by sounds or classes of sounds to which the device is exposed. Examples of sounds or classes of sounds include spoken words, the source of spoken words, music, a type of music, conversation, traffic sounds, vehicular sounds, or sounds associated with a service area or service establishment (e.g. sounds of glassware, sounds of latrines, etc.). Other sounds or class of sound include at least one sound of human activity, animal sounds, weather sounds, or other nature sounds.

The local context may be at least partially determined from images obtained from the local environment. For example, one or more digital photographs of the device environment may be processed to help determine the local context. Images, sounds, and other signals may be processed to help determine at least one device or person in proximity to the processing device.

Communication signals directed from the processing device to a remote device may be filtered at least in part according to the local context. Filtering may include altering a level, pitch, tone, or frequency content of sound information (e.g. digital audio) of the communication of the processing device. Filtering may include removing, restricting, or suppressing sound information of the communication of the processing device (e.g. omitting or suppressing particular undesirable background sounds). Intensity, color content, shading, lighting, hue, saturation, reflectivity, or opacity of visual information (e.g. digital images and video) of the communication. Filtering may include removing, reducing, restricting, or suppressing visual information of the communication of the processing device (e.g. removing or suppressing background visual information). For example, if the processing device includes a camera, the camera feed to the remote device may be restricted to one or more sub-regions of the camera field, so as to omit undesirable background information.

The remote communication context may also provide important information that may be relevant to filtering the communication signals of the processing device. The remote communication context is the environment/context in which the remote device is operating. Determining a remote communication context may include identifying an attribute of a caller, such as an identity of the caller. Examples of an identity of the caller include the caller's phone number or other communication address, the caller's membership in a group, organization, or other entity, or the caller's level of authority (e.g. is the caller a boss, an employee, an associate, etc.), or some other attribute of the caller. Examples of caller attributes include the caller's age, gender, location, emotional or physical state of the caller, or how the caller is related to the party operating the processing device (e.g. is the caller a spouse, a child, etc.).

Determining a remote communication context may include processing an image obtained from the remote context, for example to perform feature extraction or facial or feature recognition. Sound information obtained from the remote context may be processed to perform voice recognition, tone detection, or frequency analysis. Images, sounds, or other information of the remote context may be processed to identify a functional object of the remote context (see the discussion preceding for examples of functional objects), and/or to identify at least one device or person proximate to the remote device.

Communication signals of the processing device may then be filtered according to at least one of the local and the remote contexts.

Figure 3:
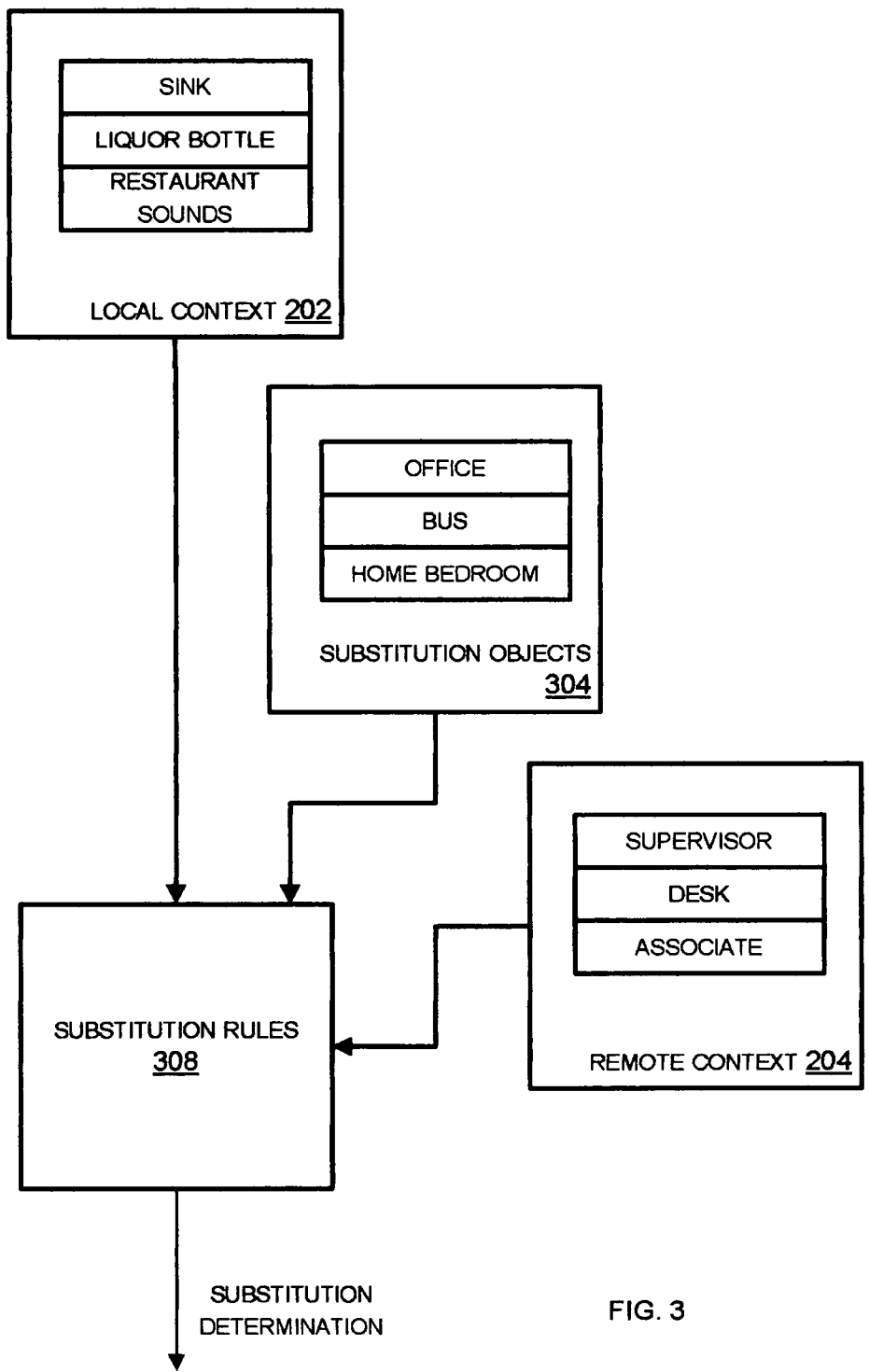
FIG. 3 is a block diagram of an embodiment of a process to substitute pre-selected information in a device communication.

FIG. 3 is a block diagram of an embodiment of a process to substitute pre-selected information in a device communication. Various substitution objects 304 are available to apply to the device communication. For example the substitution objects 304 may include visual and sound information for an office, a bus, or a home bedroom. Based upon information ascertained from the local and/or remote communication contexts, the substitution rules 308 may select from among the substitution objects to make substitution determinations that affect the device communications. For example, based upon the called party being in a bar, and the caller being the boss, the substitution rules may determine to replace the visual background and sounds of the bar with visuals and sounds of the called party's home bedroom. Thus, the called party may appear to the caller to be home sick in bed. As another example, a caller may be located in a train station and make a call on his cell-phone. The station may include a lot of background noise that is undesirable to transmit with the call, but it might be useful, depending on the context, to transmit (and/or transform) some part of the information that is present in the station environment. If the target of the call is a casual business colleague, a generic "travel" ambient sound may be conveyed in place of the background station noise that simply conveys the fact that the caller is on the road. However, when calling a close colleague or family member, a travel theme may be presented in place of the background noise that indicates the city the traveler is in, while preserving the background announcement that the train is boarding.

Thus, filtering communication of the device may include substituting pre-selected sound or image information for information of the communication, for example, substituting pre-selected office sounds for sounds of a drinking establishment, or substituting pre-selected visuals for images and/or video communicated by the device.

Figure 4:
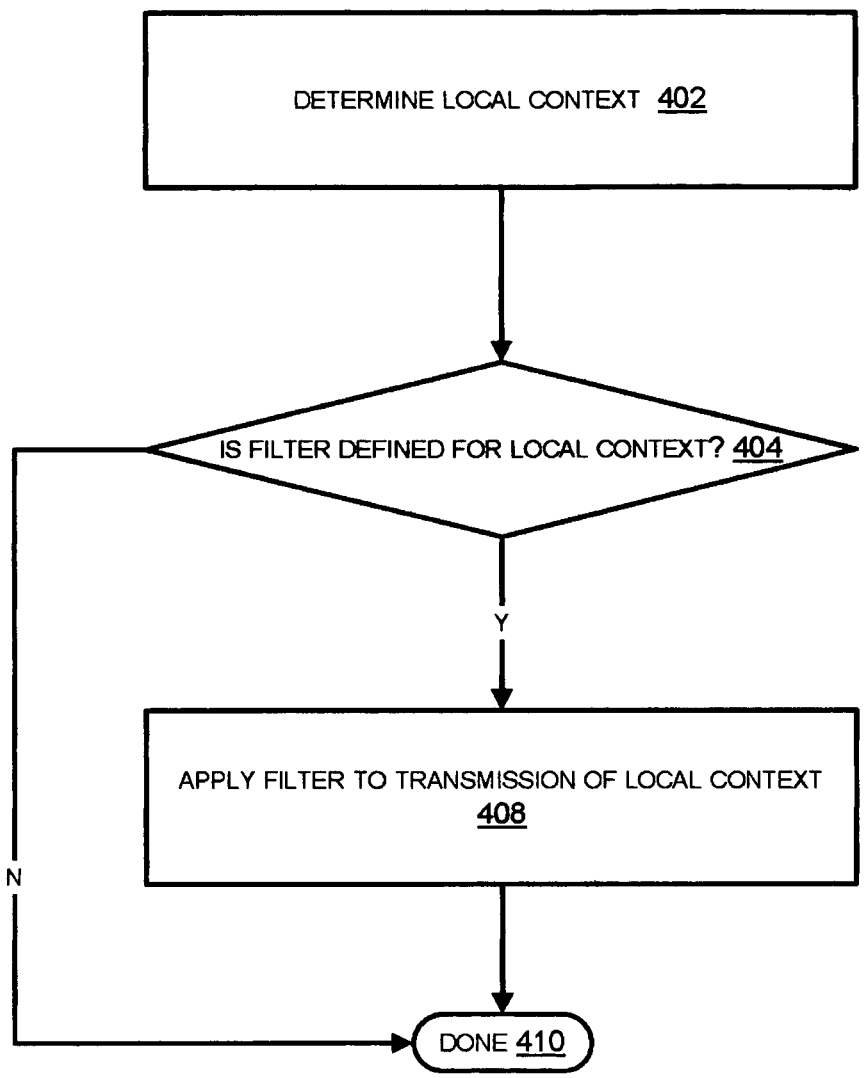
FIG. 4 is a flow chart of an embodiment of a process to determine a filter to apply to device communication according to a local communication context.

FIG. 4 is a flow chart of an embodiment of a process to determine a filter to apply to device communication according to a local communication context. At 402 a local context of a communication device is determined.

If at 404 a filter is defined for the local context and/or aspects thereof, the filter is applied at 408 to communications of the device, to alter communicated features of the local context (e.g. to remove indications of the place, people that around, and so on). At 410 the process concludes.

Figure 5:
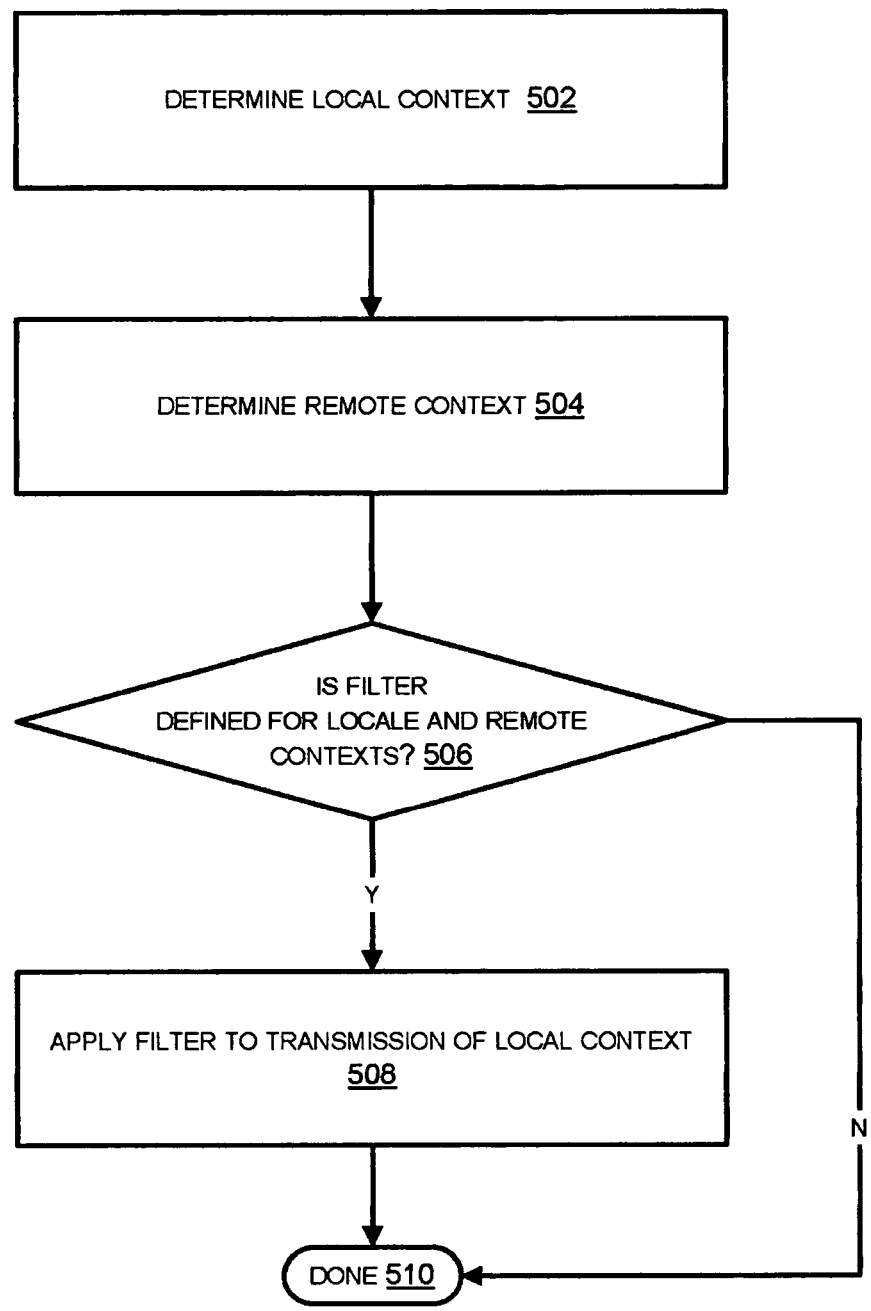
FIG. 5 is a flow chart of an embodiment of a process to determine a filter to apply to device communication according to a local and remote communication context.

FIG. 5 is a flow chart of an embodiment of a process to determine a filter to apply to device communication according to local and/or remote communication contexts. At 502 the local context and/or features thereof are determined. At 504 the remote context and/or features thereof are determined. If at 506 a filter is defined for aspects of the locale and/or remote contexts, the filter is applied to communications of the device at 508. At 510 the process concludes.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

What is claimed is:

1. A method at least partly performed using one or more processing components, the method comprising:
   determining at least one local context based at least partly on one or more images obtained by one or more cameras of a device; and
   altering at least part of at least one communication involving the device at least in part according to one or more rules defined for the at least one local context determined based at least partly on the one or more images obtained by the one or more cameras of the device.

2. A method at least partly performed using one or more processing components, the method comprising:
   determining at least one remote context associated with a device based at least partly on one or more images obtained by one or more cameras of the device; and
   altering at least part of at least one communication involving the device at least in part according to one or more rules defined for the at least one remote context determined based at least partly on the one or more images obtained by the one or more cameras of the device.

3. A system comprising:
   circuitry configured for determining at least one local context based at least partly on one or more images obtained by one or more cameras of a device; and
   circuitry configured for altering at least part of at least one communication involving the device at least in part according to one or more rules defined for the at least one local context determined based at least partly on the one or more images obtained by the one or more cameras of the device.

4. The system of claim 3, wherein the circuitry configured for determining at least one local context based at least partly on one or more images obtained by one or more cameras of a device comprises:
   circuitry configured for determining at least one local context based at least partly on one or more images obtained by one or more cameras of one or more of the following types of devices: wireless device, phone device, personal computer, personal digital assistant, and/or television.

5. The system of claim 3, wherein the circuitry configured for determining at least one local context based at least partly on one or more images obtained by one or more cameras of a device comprises:
   circuitry configured for determining at least one local context based at least partly on at least one functional object identified in one or more images obtained by one or more cameras of a device.

6. The system of claim 3, wherein the circuitry configured for determining at least one local context based at least partly on one or more images obtained by one or more cameras of a device comprises:
   circuitry configured for determining at least one local context based at least partly on one or more of the following types of objects identified in one or more images obtained by one or more cameras of a device: a machine, a control, a tool, a fixture, an appliance, and/or a utility feature.

7. The system of claim 3, wherein the circuitry configured for determining at least one local context based at least partly on one or more images obtained by one or more cameras of a device comprises:
   circuitry configured for determining at least one local context based at least partly on at least one designated location, area, or zone identified in one or more images obtained by one or more cameras of a device.

8. The system of claim 3, wherein the circuitry configured for determining at least one local context based at least partly on one or more images obtained by one or more cameras of a device comprises:

circuitry configured for determining at least one local context based at least partly on one or more images and audio obtained by a device.

9. The system of claim 3, wherein the circuitry configured for determining at least one local context based at least partly on one or more images obtained by one or more cameras of a device comprises:
    circuitry configured for determining at least one local context based at least partly on one or more images obtained by one or more cameras of a device and based at least partly on at least one of the following types of sounds: background, sink, liquor bottle, restaurant, spoken word, music, conversation, traffic, vehicle, service area, service establishment, human activity, animal, weather, and/or nature.

10. The system of claim 3, wherein the circuitry configured for determining at least one local context based at least partly on one or more images obtained by one or more cameras of a device comprises:
    circuitry configured for determining at least one local context based at least partly on one or more digital photographs obtained one or more cameras of by a device.

11. The system of claim 3, wherein the circuitry configured for determining at least one local context based at least partly on one or more images obtained by one or more cameras of a device comprises:
    circuitry configured for determining at least one local context based at least partly on at least one video obtained by one or more cameras of a device.

12. The system of claim 3, wherein the circuitry configured for determining at least one local context based at least partly on one or more images obtained by one or more cameras of a device comprises:
    circuitry configured for determining at least one local context based at least partly on at least one device or person identified in one or more images obtained by one or more cameras of a device.

13. The system of claim 3, wherein the circuitry configured for determining at least one local context based at least partly on one or more images obtained by one or more cameras of a device comprises:
    circuitry configured for determining at least one local context based at least partly on one or more images obtained by one or more cameras of a device and based at least partly on proximity to one or more devices, objects, and/or people.

14. The system of claim 3, wherein the circuitry configured for determining at least one local context based at least partly on one or more images obtained by one or more cameras of a device comprises:
    circuitry configured for determining at least one local context based at least partly on one or more images obtained by one or more cameras of a device and based at least partly on detection of at least one signal or class of signals.

15. The system of claim 3, wherein the circuitry configured for altering at least part of at least one communication involving the device at least in part according to one or more rules defined for the at least one local context determined based at least partly on the one or more images obtained by the one or more cameras of the device comprises:
    circuitry configured for altering one or more of level, pitch, tone, and/or frequency of at least part of at least one communication involving the device at least in part according to one or more rules defined for the at least one local context determined based at least partly on the one or more images obtained by the one or more cameras of the device.

16. The system of claim 3, wherein the circuitry configured for altering at least part of at least one communication involving the device at least in part according to one or more rules defined for the at least one local context determined based at least partly on the one or more images obtained by the one or more cameras of the device comprises:
    circuitry configured for at least one of filtering, substituting, reducing, removing, restricting, and/or suppressing at least part of at least one communication involving the device at least in part according to one or more rules defined for the at least one local context determined based at least partly on the one or more images obtained by the one or more cameras of the device.

17. The system of claim 3, wherein the circuitry configured for altering at least part of at least one communication involving the device at least in part according to one or more rules defined for the at least one local context determined based at least partly on the one or more images obtained by the one or more cameras of the device comprises:
    circuitry configured for substituting at least one object sound with at least one other object sound within at least one communication involving the device at least in part according to one or more rules defined for the at least one local context determined based at least partly on the one or more images obtained by the one or more cameras of the device.

18. The system of claim 3, wherein the circuitry configured for altering at least part of at least one communication involving the device at least in part according to one or more rules defined for the at least one local context determined based at least partly on the one or more images obtained by the one or more cameras of the device comprises:
    circuitry configured for altering at least one of intensity, color content, shading, lighting, hue, saturation, reflectivity, and/or opacity of visual information associated with at least one communication involving the device at least in part according to one or more rules defined for the at least one local context determined based at least partly on the one or more images obtained by the one or more cameras of the device.

19. The system of claim 3, wherein the circuitry configured for altering at least part of at least one communication involving the device at least in part according to one or more rules defined for the at least one local context determined based at least partly on the one or more images obtained by the one or more cameras of the device comprises:
    circuitry configured for altering audio, image, and/or video content associated with at least one communication involving the device at least in part according to one or more rules defined for the at least one local context determined based at least partly on the one or more images obtained by the one or more cameras of the device.

20. The system of claim 3, wherein the circuitry configured for altering at least part of at least one communication involving the device at least in part according to one or more rules defined for the at least one local context determined based at least partly on the one or more images obtained by the one or more cameras of the device comprises:
    circuitry configured for altering at least part of at least one communication involving the device at least in part according to one or more rules defined for (i) at least one attribute or identity of one or more parties involved in the at least one communication and (ii) the at least one local context determined based at least partly on the one or more images obtained by the one or more cameras of the device.

21. The system of claim 3, wherein the circuitry configured for altering at least part of at least one communication involving the device at least in part according to one or more rules defined for the at least one local context determined based at least partly on the one or more images obtained by the one or more cameras of the device comprises:

circuitry configured for altering at least part of at least one communication involving the device at least in part according to one or more rules defined for (i) at least one remote context and (ii) the at least one local context determined based at least partly on the one or more images obtained by the one or more cameras of the device.

22. The system of claim 3, wherein the circuitry configured for determining at least one local context based at least partly on one or more images obtained by one or more cameras of a device comprises:

circuitry configured for determining at least one local environment associated with a device based at least partly on one or more images obtained by one or more cameras of the device.

23. The system of claim 3, wherein the circuitry configured for determining at least one local context based at least partly on one or more images obtained by one or more cameras of a device comprises:

circuitry configured for determining at least one local context based at least partly on one or more people present in one or more images obtained by one or more cameras of a device, wherein the circuitry configured for altering at least part of at least one communication involving the device at least in part according to one or more rules defined for the at least one local context determined based at least partly on the one or more images obtained by the one or more cameras of the device comprises circuitry configured for adding information to at least part of at least one communication involving the device at least in part according to one or more rules defined for the at least one local context determined based at least partly on the one or more people present in the one or more images obtained by the one or more cameras of the device.

24. The system of claim 3, wherein the circuitry configured for determining at least one local context based at least partly on one or more images obtained by one or more cameras of a device comprises:

circuitry configured for determining at least one object, person, or place around a device based at least partly on one or more images obtained by one or more cameras of the device.

25. The system of claim 3, wherein the circuitry configured for altering at least part of at least one communication involving the device at least in part according to one or more rules defined for the at least one local context determined based at least partly on the one or more images obtained by the one or more cameras of the device comprises:

circuitry configured for adding information to at least part of at least one communication involving the device at least in part according to one or more rules defined for the at least one local context determined based at least partly on the one or more images obtained by the one or more cameras of the device.

26. A system comprising:

circuitry configured for determining at least one remote context based at least partly on one or more images obtained by one or more cameras of a device; and circuitry configured for altering at least part of at least one communication involving the device at least in part according to one or more rules defined for the at least one remote context determined based at least partly on the one or more images obtained by the one or more cameras of the device.

27. The system of claim 3, wherein the circuitry configured for altering at least part of at least one communication involving the device at least in part according to one or more rules defined for the at least one local context determined based at least partly on the one or more images obtained by the one or more cameras of the device comprises:

circuitry configured for at least one of restricting or substituting visual information associated with at least one communication involving the device at least in part according to one or more rules defined for the at least one local context determined based at least partly on the one or more images obtained by the one or more cameras of the device.

28. The system of claim 3, wherein the circuitry configured for altering at least part of at least one communication involving the device at least in part according to one or more rules defined for the at least one local context determined based at least partly on the one or more images obtained by the one or more cameras of the device comprises:

circuitry configured for altering at least part of at least one video or image communication involving the device at least in part according to one or more rules defined for the at least one local context determined based at least partly on the one or more images obtained by the one or more cameras of the device.

29. The system of claim 3, further comprising:

circuitry configured for performing at least one of facial recognition, feature recognition, or feature extraction on at least one image.

* * * * *